(12) United States Patent
O'Connor et al.

(10) Patent No.: US 6,188,392 B1
(45) Date of Patent: *Feb. 13, 2001

(54) ELECTRONIC PEN DEVICE

(75) Inventors: Michael O'Connor, Cupertino; David S. Vannier, Saratoga, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/884,922

(22) Filed: Jun. 30, 1997

(51) Int. Cl.$^7$ ....................................... G09G 5/00
(52) U.S. Cl. .................. 345/179; 178/18.01; 178/18.03; 178/19.01; 178/19.03; 178/19.04
(58) Field of Search ..................................... 345/173, 179; 178/18.01, 18.03, 19.01, 19.03, 19.04

(56) References Cited

U.S. PATENT DOCUMENTS

| | | |
|---|---|---|
| Re. 29,765 | 9/1978 | Crane et al. . |
| D. 362,663 | 9/1995 | Nguyen . |
| 3,906,444 | 9/1975 | Crane et al. . |
| 3,915,015 | 10/1975 | Crane et al. . |
| 4,142,175 * | 2/1979 | Herbst et al. .......................... 382/314 |
| 4,241,409 * | 12/1980 | Nolf ...................................... 364/705 |
| 4,345,239 | 8/1982 | Elliott . |
| 4,468,694 | 8/1984 | Edgar . |
| 4,513,437 | 4/1985 | Chainer et al. . |
| 4,545,018 | 10/1985 | Clements et al. . |
| 4,561,105 | 12/1985 | Crane et al. . |
| 4,731,857 | 3/1988 | Tappert . |
| 4,751,741 | 6/1988 | Mochinaga et al. . |

(List continued on next page.)

FOREIGN PATENT DOCUMENTS

| | | |
|---|---|---|
| 9-190271 | 8/1996 | (JP) . |
| WO 93/08542 | 4/1993 | (WO) . |
| WO 94/18663 | 8/1994 | (WO) . |

OTHER PUBLICATIONS

Digital pen recalls what it has written by Michele Clarke.
"Aeropoint User's Guide," Creative Labs, pp. 1–1 and 1–3, Oct. 1994.
"Atypical mice and related devices," Computer, IEEE Computer Society, vol. 28, No. 6, pp. 92 & 94, Jun. 1995.
"The Data Pen User's Guide," Primax Electronics, p. 1, 1994.
Clarke, Michele, "Digital Pen Recalls What It Has Written," Source unknown, pages unknown.
Torok, G.P., "Electronic Blackboard Have Chalk Will Travel," International Conference on Communications, pp. 19.1–22 thrugh 19.1–25, Jun. 12–15, 1997.

Primary Examiner—Richard A. Hjerpe
Assistant Examiner—Henry N. Tran
(74) Attorney, Agent, or Firm—Blakely, Sokoloff, Taylor & Zafman LLP

(57) ABSTRACT

A marking device is provided. The marking device (MD) includes an elongated housing that has a tip configured to contact a surface. The MD also includes a pressure sensor disposed within the housing. The pressure sensor is coupled to the tip and is configured to detect when the tip contacts the surface. The MD further includes first and second acceleration sensors disposed within the housing and adjacent the tip of the MD. The first and second acceleration sensors are configured to sense acceleration of the tip in first and second directions. Responsive to the sensing of acceleration, first and second acceleration sensors generate a signal indicative of acceleration in first and second directions. The MD also includes a conversion device configured to receive first and second signals and convert first and second signals into at least one computer readable signal.

16 Claims, 6 Drawing Sheets

U.S. PATENT DOCUMENTS

| | | |
|---|---|---|
| 4,787,051 | 11/1988 | Olson . |
| 4,806,707 | 2/1989 | Landmeier . |
| 4,856,077 | 8/1989 | Rothfjell . |
| 4,883,926 * | 11/1989 | Baldwin ................................ 178/18 |
| 4,988,981 | 1/1991 | Zimmerman et al. . |
| 5,022,086 | 6/1991 | Crane et al. . |
| 5,025,314 | 6/1991 | Tang et al. . |
| 5,027,115 | 6/1991 | Sato et al. . |
| 5,159,321 * | 10/1992 | Masaki et al. ....................... 345/179 |
| 5,164,585 | 11/1992 | Lieu . |
| 5,181,181 | 1/1993 | Glynn . |
| 5,215,397 | 6/1993 | Taguchi et al. . |
| 5,226,091 | 7/1993 | Howell et al. . |
| 5,227,622 | 7/1993 | Suzuki . |
| 5,239,292 | 8/1993 | Willan . |
| 5,247,137 * | 9/1993 | Epperson ......................... 178/19.04 |
| 5,294,792 * | 3/1994 | Lewis et al. ........................ 250/221 |
| 5,296,871 | 3/1994 | Paley . |
| 5,369,227 * | 11/1994 | Stone ..................................... 178/18 |
| 5,371,516 | 12/1994 | Toyoda et al. . |
| 5,396,265 | 3/1995 | Ulrich et al. . |
| 5,408,382 | 4/1995 | Schultz et al. . |
| 5,434,371 * | 7/1995 | Brooks .................................. 178/18 |
| 5,436,792 | 7/1995 | Leman et al. . |
| 5,440,326 | 8/1995 | Quinn . |
| 5,444,192 | 8/1995 | Shetye et al. . |
| 5,477,012 | 12/1995 | Sekendur . |
| 5,506,605 | 4/1996 | Paley . |
| 5,512,892 | 4/1996 | Corballis et al. . |
| 5,517,579 | 5/1996 | Baron et al. . |
| 5,526,018 | 6/1996 | Fisher . |
| 5,548,092 * | 8/1996 | Shriver .................................. 178/18 |
| 5,570,109 | 10/1996 | Jenson . |
| 5,587,558 | 12/1996 | Matsushima . |
| 5,587,560 | 12/1996 | Crooks et al. . |

* cited by examiner

ELECTRONIC PEN DEVICE

BACKGROUND OF THE INVENTION (1) Field of the Invention

The present invention relates to devices or systems for entering information into a data processing machine. More specifically, the present invention relates to devices and systems that capture and store information related to hand written or hand drawn text, characters, symbols or graphics.

(2) Description of Related Art

A computer system typically includes an alphanumeric keyboard that enables users to enter commands and data in a text format to be processed by a data processing machine such as a computer. Keyboards are the most commonly used input devices for computers. However, keyboards require users to develop skills in typing, they are not well suited for entering graphics data, and they are usually tethered to the computer by means of a cable. Additionally, keyboards require users to learn many particular keystroke sequences to invoke corresponding computer commands, requiring more time to implement and more effort to learn.

A variety of additional input devices have been proposed and implemented for use in connection with computers, to work as adjuncts to the common keyboard, or as an alternative for applications for which the keyboard is not well suited. One input device commonly used is the mouse pointing device that is efficient for invoking particular computer commands. This device is typically connected to the computer by way of an electrical cable and must be used in close proximity to the computer. The mouse pointing device functions satisfactorily for the purpose of initiating particular computer functions, but users regard the device as awkward and imprecise for entering text and graphics data.

Other input devices include digitizer tablets that involve the use of a flat touch pad which can be touched by a stylus. The pad senses the location of the touching object usually by resistance or capacitance disturbances in a field associated with the pad. Digitizer tablets perform well for entering graphics, report absolute position well, but are impractical for entering textual data.

Certain tablets have been proposed by which both graphics and textual data could be entered in a computer using a stylus. These devices are typically tethered to the user's computer by an electrical cable, and provide no memory storage to permit autonomous usage. Further, these devices are inconvenient for the user due to their physical dimensions. Most users, would find it desirable to have a computer input device that: is autonomous, i.e. untethered by cable connection to a computer; permits easy and precisely controllable input of both text and graphics data; fits in the hand like a pen or pencil for ease of use; affords memory capacity to store accumulated input of data of most users over the course of a day; and can be carried unobtrusively in a user's pocket.

Furthermore, recently there has been an increased interest in input devices or systems that may be used for manually entering data in the computer and also for handwriting recognition and signature verification. These devices utilize a pen or stylus for tracing a path on a resistive grid or capacitive grid on a graphics tablet or computer screen. The computer digitizes the information conveyed by the pen when the pen crosses a certain predetermined point on the grid. Data processing is then utilized for processing a two-dimensional pattern produced on the grid to determine the motion of the pen. Data processing further processes the information as an image information.

However, these devices do not produce an accurate recording of the text or graphics that have been input via the tablet or the screen. Considerable information indicative of the motion of the pen is lost in the processing of data. One reason is that data describing the motion of the pen is undersampled. The sampling of the pen tip position is performed first spatially as the tip of the pen crosses the resistive or capacitative elements which make up the grid. The pen tip position is also sampled temporarily by the electronics which scan the grid. For such grid devices, a finer resolution may be required to provide sufficient data for handwriting recognition. However, when finer resolution is provided, grid cost dramatically increases. Another disadvantage of these devices is that processing is performed essentially as a two-dimensional or spatial pattern recognition and the amount of processing for handwriting recognition increases nearly as the square of the number of samples. Moreover, when a pen input device is utilized for handwriting or graphics, an additional dimension, such as a third dimension and rotation about each axis in connection with the three dimensions, involved in the motion of the pen input device, must be measured to provide accurate information about two-dimensional tracing on a writing surface in connection with text or graphics input to the computer. This additional information may, for example, provide information about the Z coordinate or the rotation of a predetermined point of the pen input device in the course of its motion.

To eliminate the difficulty posed by rotation, some conventional input devices have focused on detecting the motion of the pen in two dimensions. In these devices, the elements measuring the motion of the pen in two dimensions are placed intermediately pen input device relative to an axis passing through a tip of the pen and free end of the pen located away from the tip. Also, these elements may be placed at the free end of the pen input device. However, the measurement in two directions (X and Y) recorded by these elements is not accurate as the farther these elements are from the tip of the pen, the more a measurement in the third dimension (Z axis) and measurement of the rotation about each axis is necessary to accurately reflect the motion.

It is desirable to provide an input device that provides an accurate detection of the two dimensional motion of the tip of the pen on the writing surface thereby providing accurate information about the text or graphics input to a computer. The rotation of the input device about the tip of the pen and around the axes of the pen particularly poses significant problems in its measurement and "interpretation" thereof with respect to the text or graphics information input to the computer. Furthermore, it is desirable to provide an input device that eliminates the difficulty connected to accurate measurement of rotation explained above. Moreover, it is desirable to provide an input device at a lower cost than the cost of a grid with fine resolution. Also, it is desirable to provide an input device such as a marking device that can use existing paper/tablet as writing surface so that the user of the pen may also see the mark the marking device leaves on the writing surface as the marking device is utilized for text or graphics. It is also desirable to provide a marking device that captures and stores detailed information about the dynamic motion of the marking device as it is used in writing, drawing, and illustration.

BRIEF SUMMARY OF THE INVENTION

The present invention provides a marking device. The marking device (MD) includes an elongated housing that has a tip configured to contact a surface. The MD also includes a pressure sensor disposed within the housing. The pressure sensor is coupled to the tip and is configured to detect when the tip contacts the surface. The MD further includes first and second acceleration sensors disposed within the housing and adjacent the tip of the MD. The first and second acceleration sensors are configured to sense acceleration of the tip in first and second directions. Responsive to the sensing of acceleration, first and second acceleration sensors generate a signal indicative of acceleration in first and second directions. The MD also includes a conversion device configured to receive first and second signals and convert first and second signals into at least one computer readable signal.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one of ordinary skill in the art will recognize that the invention may be practiced without these specific details. In some instances, well-known circuits, structures, and techniques have not been shown in detail to avoid obscuring the present invention.

Figure 1:
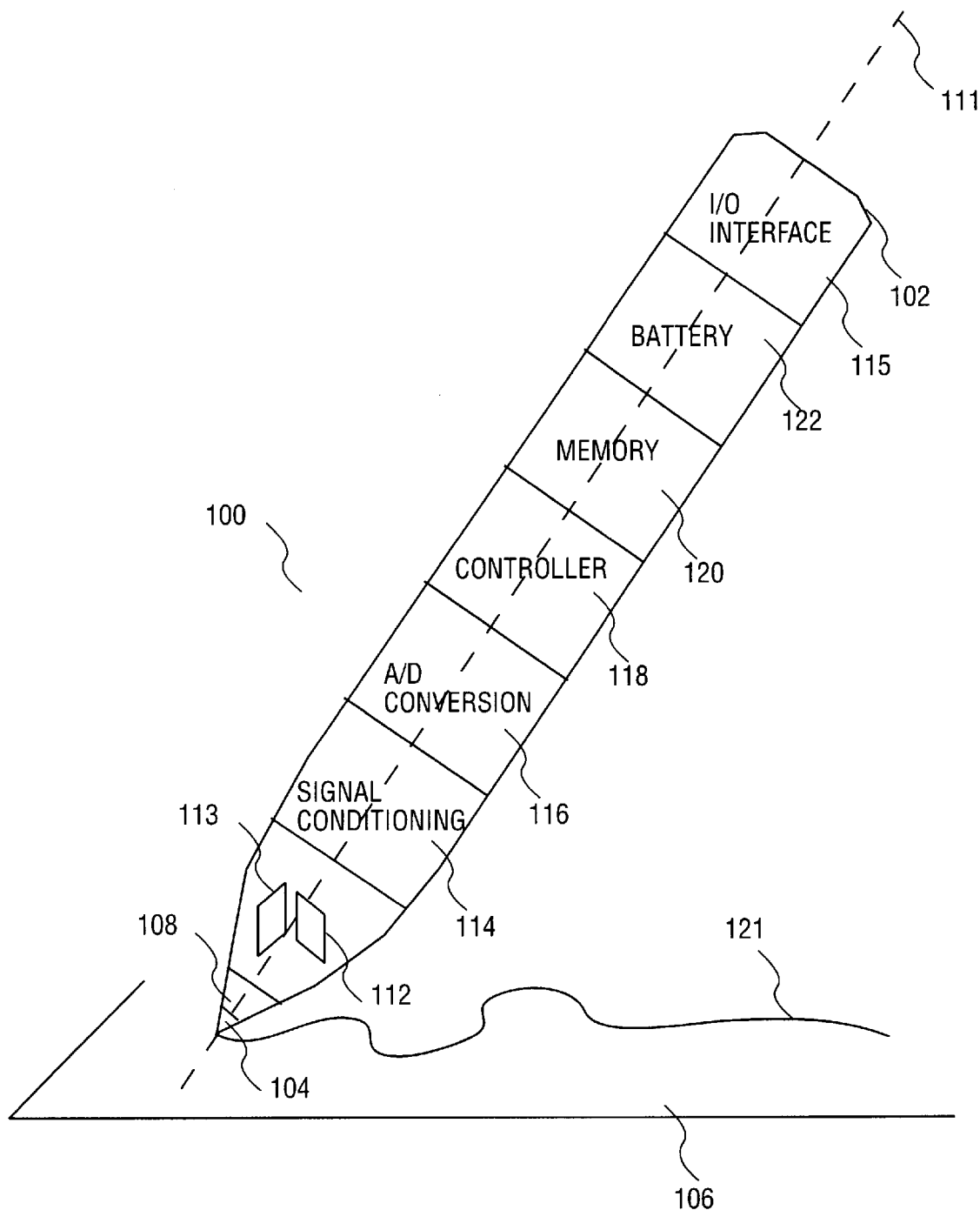
FIG. 1 illustrates an embodiment of a marking device (MD) according to the present invention.

FIG. 1 illustrates an embodiment of a marking device (MD) 100 (also referred as "pen 100") according to the present invention. MD 100 includes an elongated housing 102 (hereinafter referred as "housing 102") with a hollow interior that accommodates a plurality of components of MD 100. Also, housing 102 may be made of, or have an outer surface made of, a conductive material such as conductive plastic or metal to shield inner components included in housing 102 from electromagnetic noise. The components of MD 100 may be supported by a support structure (not shown) located inside housing 102.

Housing 102 has a tip 104 at an end thereof. Tip 104 is configured to contact a marking surface 106, which may be a piece of paper, a tablet, or a screen such as the screen of a computer. Tip 104 may be of a ball-point type in communication with a ball-point ink cartridge (not shown) that may optionally be placed inside housing 102. It should be understood that it is not necessary that tip 104 communicates with a ball-point ink cartridge or that it includes leads for actually marking surface 106. In certain applications where it is important to preserve secrecy, it may be desirable that tip 104 does not produce an actual mark on marking surface 106.

Tip 104 may be attached to a tip holder (not shown) at one end thereof. The tip holder may have at the other end thereof a structure for attaching an ink cartridge or other type of cartridges to communicate with tip 104. Coupled to tip 104 is a pressure sensor 108. The pressure sensor typically senses contact or pressure applied by tip 104 when this tip contacts or is pressed against surface 106. In one embodiment according to the present invention, pressure sensor 108 may be a microswitch, but the present invention is not limited to a microswitch implementing the pressure sensor. Pressure sensor 108 may also be implemented as a piezo electric pressure transducer known in the art. The piezoelectric pressure transducer may have a tubular shape or any other shape disposed in a direction parallel to axis 111 that passes along housing 102. Typically, the piezo-electric sensor may have at least one pair of electrodes coupled to a piezo-electric element which may be compressed as a result of the pressure exerted to the tip 104. The piezo-electric transducer may then convey the resulting compression exerted thereto into an electrical signal.

MD 100 further includes first and second acceleration sensors 112 and 113 disposed in housing 102 adjacent tip 104. Acceleration sensors 112 and 113 are configured to sense and provide a measure related to acceleration of tip 104 in first and second directions which may be, but are not limited to, X and Y directions in a three-dimensional carthesian system of coordinates. The acceleration of tip 104 in first and second directions, the information from the pressure sensor and temporal information related to the sampling of the acceleration sensors may be later processed by a processing device to determine speed, position, angular information about the composite acceleration, etc. Such processing may be based on well established mathematical formulae, well known in the art, from which one may determine, based on acceleration, speed, position, etc.

In response to the determination of acceleration in first and second directions, first and second acceleration sensors generate first and second signals which may be, but are not limited to, electrical signals. The acceleration sensors capture information about the dynamic motion of MD 100, i.e., the acceleration in X and Y directions. First and second acceleration sensors may include solid state devices such as conventional acceleration sensors used in automobile airbags that are made very small so that they may be easily integrated and placed adjacent tip 104 of MD 100.

The closer the acceleration sensors 112 and 113 are to tip 104, the more accurate handwriting motion may be essentially decomposed into a two-dimensional process. Therefore by sampling acceleration of tip 104 in the X and Y direction, it is possible to detect the position of the pen at substantially any point in time. Unlike conventional electronic pen devices, the placement of two acceleration sensors adjacent the tip of the pen reduces the need for a third element that detects vertical motion or acceleration in a vertical (Z) direction caused by motion vertical motion of the pen. The placement of two acceleration sensors adjacent the tip of the pen also reduces the need for utilizing fourth, fifth, and sixth elements which detect motion or acceleration due to rotation about the X, Y and Z directions. The placement of the acceleration sensors adjacent the tip of the pen largely simplifies recognition of characters by simply detecting acceleration adjacent to the tip in two dimensions.

The MD 100 further includes a signal converter 116 that receives a signal from a signal conditioning device 114 and converts this signal into a computer readable signal such as a digital signal. In one embodiment according to the present invention, signal converter 116 is an analog-to-digital converter. The digital signal may further be driven to a compression device (not shown) where the digital signal is compressed. The digital signal is further driven to a controller 118 that may drive the digital signal to either an I/O interface (115) or to memory 120 that stores in digital form information related to the acceleration of the tip and to the pressure at the tip of MD 100.

Figure 2:
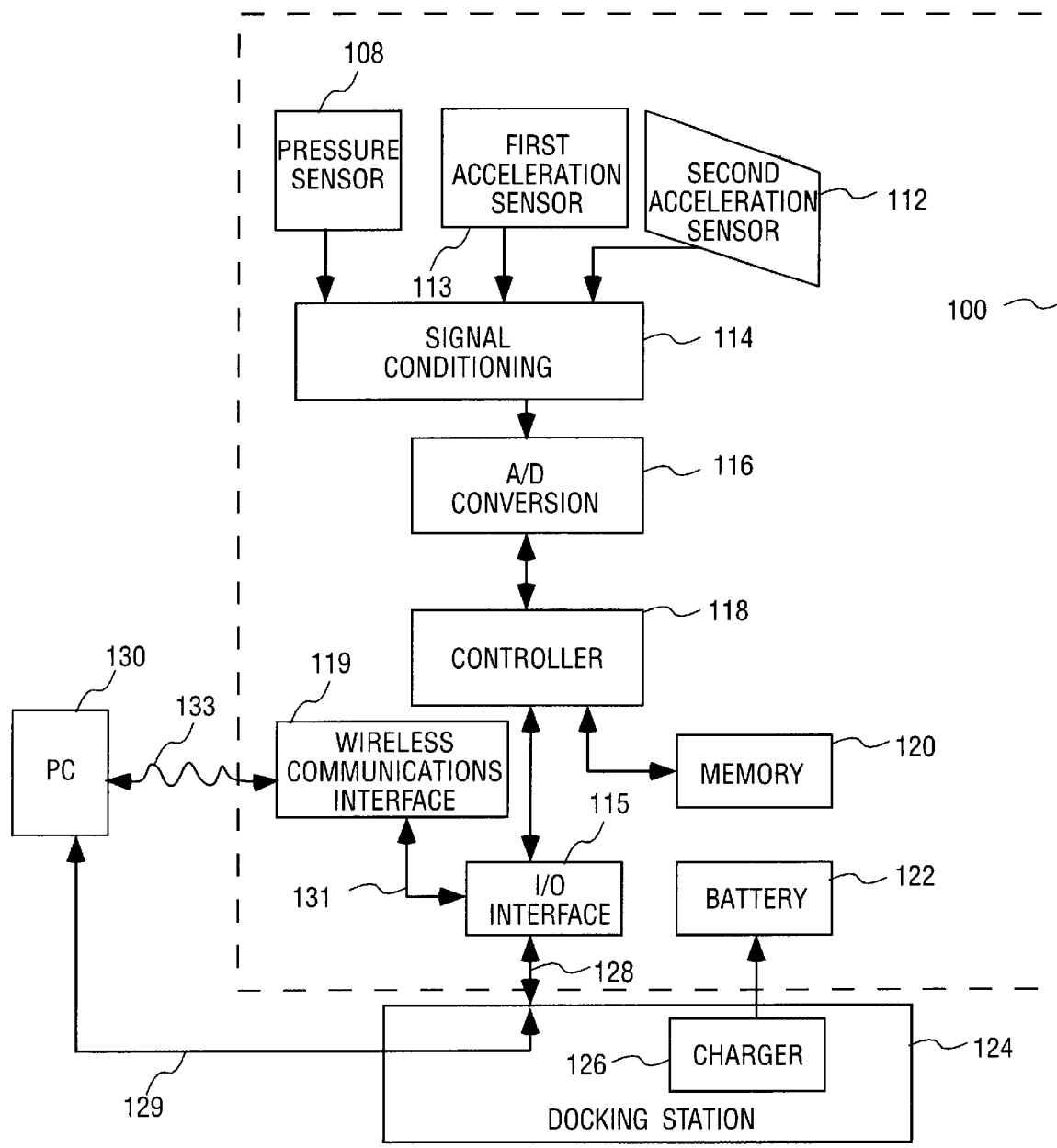
FIG. 2 illustrates, in block diagram form, main components included in an embodiment of the MD of the present invention.

FIG. 2 illustrates in block diagram form main internal components included in one embodiment of MD 100. FIG. 2 also illustrates a docking station 124 configured to dock MD 100. MD 100 includes pressure sensor 108 configured to detect when tip 104 (not shown in this figure) contacts or applies pressure to writing surface 106 of FIG. 1. Accelerometers 113 and 112, are disposed adjacent to tip 104. Acceleration sensors 112 and 113 are configured to sense acceleration of tip 104 in first and second directions. In one embodiment of the present invention acceleration sensors 112 and 113 are positioned orthogonal to each other in the X and Y directions respectively, in a three dimensional carthesian system of coordinates. In response to sensing of acceleration of tip 104 of MD 100 in the X and Y directions, first and second acceleration sensors 112 and 113 generate first and second signals to signal conditioning device 114.

Pressure sensor 108 is also coupled to signal conditioning device 114. Signal conditioning device 114 is coupled to conversion device 116 which in the embodiment of the present invention described herein is an analog-to-digital (A/D) converter. Signal conditioning device 114 processes (amplification, filtering temperature compensation) first and second signals received from acceleration sensors 112 and 113 and a third signal received from pressure sensor 108 and in response generates a signal to A/D converter 116. The signal generated by signal conditioning device 114 is typically an analog signal. The A/D device converts the analog signal, received from signal conditioning device 114, into a digital signal and drives this signal to controller 118. Note that conversion device 116 is not limited to an A/D converter but may be a device that converts signals from the acceleration sensors 112 and 113 and pressure sensor 108 into a computer readable signal.

Moreover, MD 100 does not have to include conversion device 116. In this case, conversion may be performed by a device outside MD 100, such as a conversion device positioned in docking station 124. A signal generated by signal conditioning device may be driven to a controller which further drives this signal via an I/O interface to the conversion device outside MD 100. The conversion device may send digital data back to MD 100 for storage in memory 120. It should be appreciated by persons skilled in the art that other modifications may be made with respect to the circuits included in MD 100.

Controller 118 manages conversion of data, including sampling of the data, by conversion device 116. Controller 118 also manages the flow of information to and from memory 120 and the transfer of information to data processing device 130 via I/O interface 115. Information received from conversion device 116 is driven by controller 118 to either memory 120 for storage therein or to input/output (I/O) interface 115. Note that the connection between controller 118 and memory 120 is bi-directional to afford both writing to and reading from memory 120. Also the connection between controller 118 and I/O interface 115 is bi-directional to permit sending of information to I/O interface 115 and receiving information from I/O interface 115.

The I/O interface 115 provides a serial interface for communication with a docking station 124 via line 128. The docking station 124 provides a serial interface for communication via line 129 with, a data processing device 130 such as a PC or a work station. When MD 100 is not docked, the I/O interface 115 may instead send a signal via line 131 to wireless communications interface 119. The wireless communications interface 119 may send a computer readable signal (digital signal in one embodiment according to the present invention) to the data processing device 130 through a wireless medium 133 such as air. The wireless communication interface 119 may send information by way of Radio Frequency (RF) signals, Infrared (IR) signals, or other types of wireless ways of communication. The data signals sent by wireless interface 119 to data processing device 130 include information about the acceleration of tip 104 of MD 100 in directions X and Y and information from pressure sensor 108. The digital signals may include other type of information related to other devices that may be added to MD 100 by one skilled in the art.

The wireless communications interface 119 may be utilized when it is desirable that MD 100 is portable, not connected to computer 130 by way of docking station 124. Docking station 124 may have the capability to interface with more than one MD device. The physical interface between docking station 124 and the MD device/s may be provided by any conventional connector or plug. Accordingly, MD 100 may communicate with data processing device 130 in different ways: by way of docking station 124, when MD 100 is coupled thereto; by way of wireless communication interface 119, when MD 100 is not coupled to docking hand station 124; and by way of a conductor wired to MD 100 and to data processing device 130. In one embodiment of the present invention, docking station 124 includes a battery charger 126 that may be coupled to a battery 122 of MD 100. Battery 122 provides power to the electrical structures included in MD 100.

Figure 3:
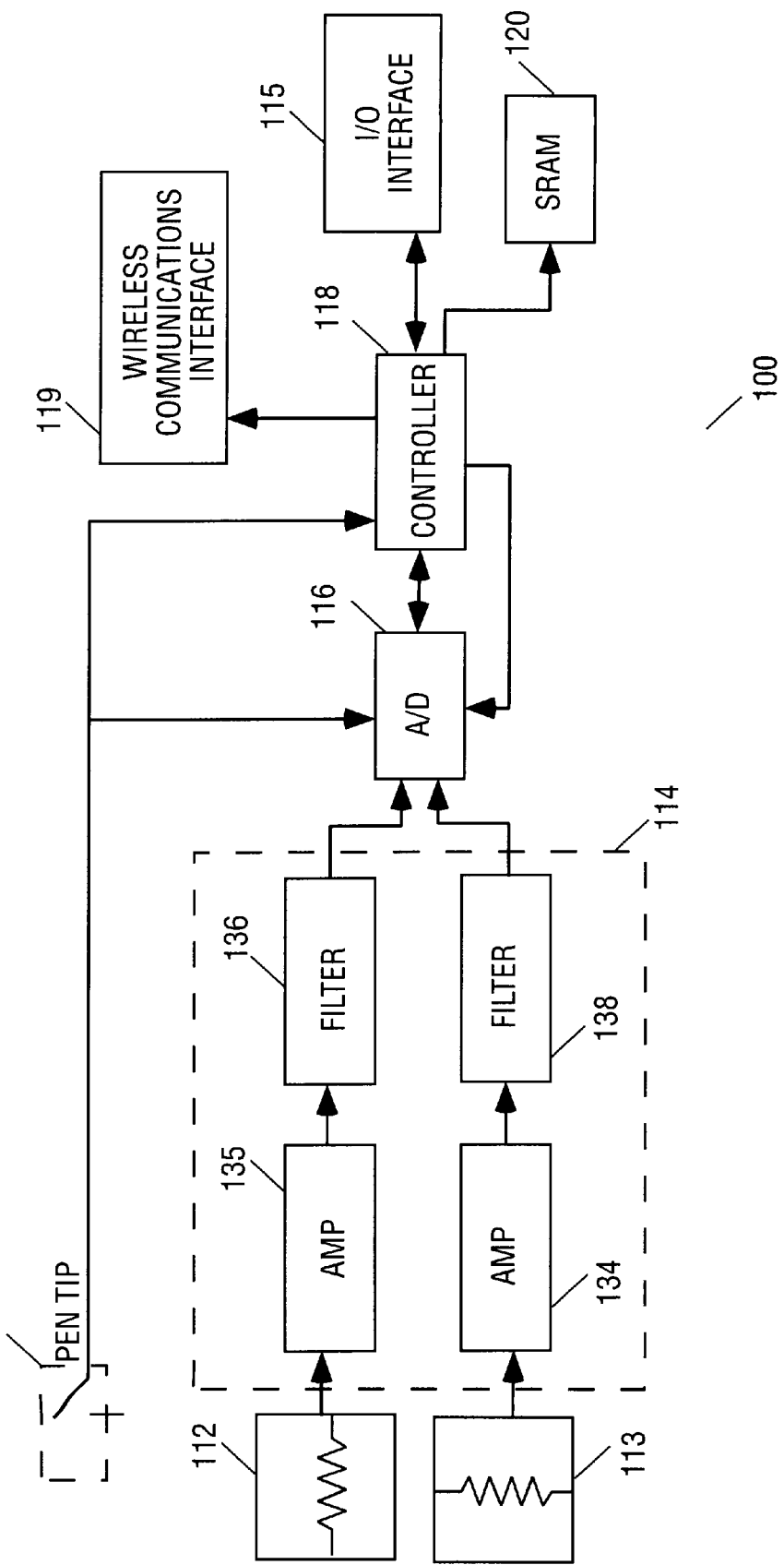
FIG. 3 illustrates in a more detailed form main components that may be included in an embodiment of the present invention.

FIG. 3 illustrates in more detailed form certain electronic devices included in MD 100. Acceleration sensors 112 and 113 are coupled to signal conditioning device 114 (shown in dotted line). Acceleration sensors 112 and 113 may be piezo resistive or piezo-capacitive devices well-known in the art. In one embodiment of the present invention, acceleration sensors 112 and 113 may be implemented as an integrated circuit such as IC 3031. Signal conditioning device 114 includes first and second amplifiers 135 and 134 coupled to first and second filters 136 and 138. Amplifier 134 is coupled at an output thereof to filter 136 and amplifier 135 is coupled at an output thereof to filter 138. These filters are further coupled to A/D device 116. In one embodiment of the present invention, amplifiers 134 and 135 also perform high pass filtering while filters 136 and 138 perform low pass filtering. A/D device 116 samples and converts the analog signals driven to it by filters 136 and 138 into a digital signal. The digital signal generated by A/D 116 is driven to controller device 118 which, in one embodiment according to the present invention, may be a microcontroller or a microprocessor. The A/D device 116 is also coupled to pressure sensor 108 that may be implemented as a micro switch or as a piezoelectric sensor known in the art. A signal indicative of contact or pressure generated by pressure sensor 108 is driven to A/D device 116 and to controller device 118. The signal from pressure sensor 108, sent to A/D 116, is further processed by A/D 116 and converted into a digital signal. Controller device 118 drives the information conveyed by the digital signal from A/D 116 to I/O interface 115, or optionally to a wireless communications interface 119, and/or to memory 120 which may be implemented as a SRAM. The signal from pressure sensor 108 is also driven to controller 118 to enable controller 118 when contact or pressure is detected.

Figure 4:
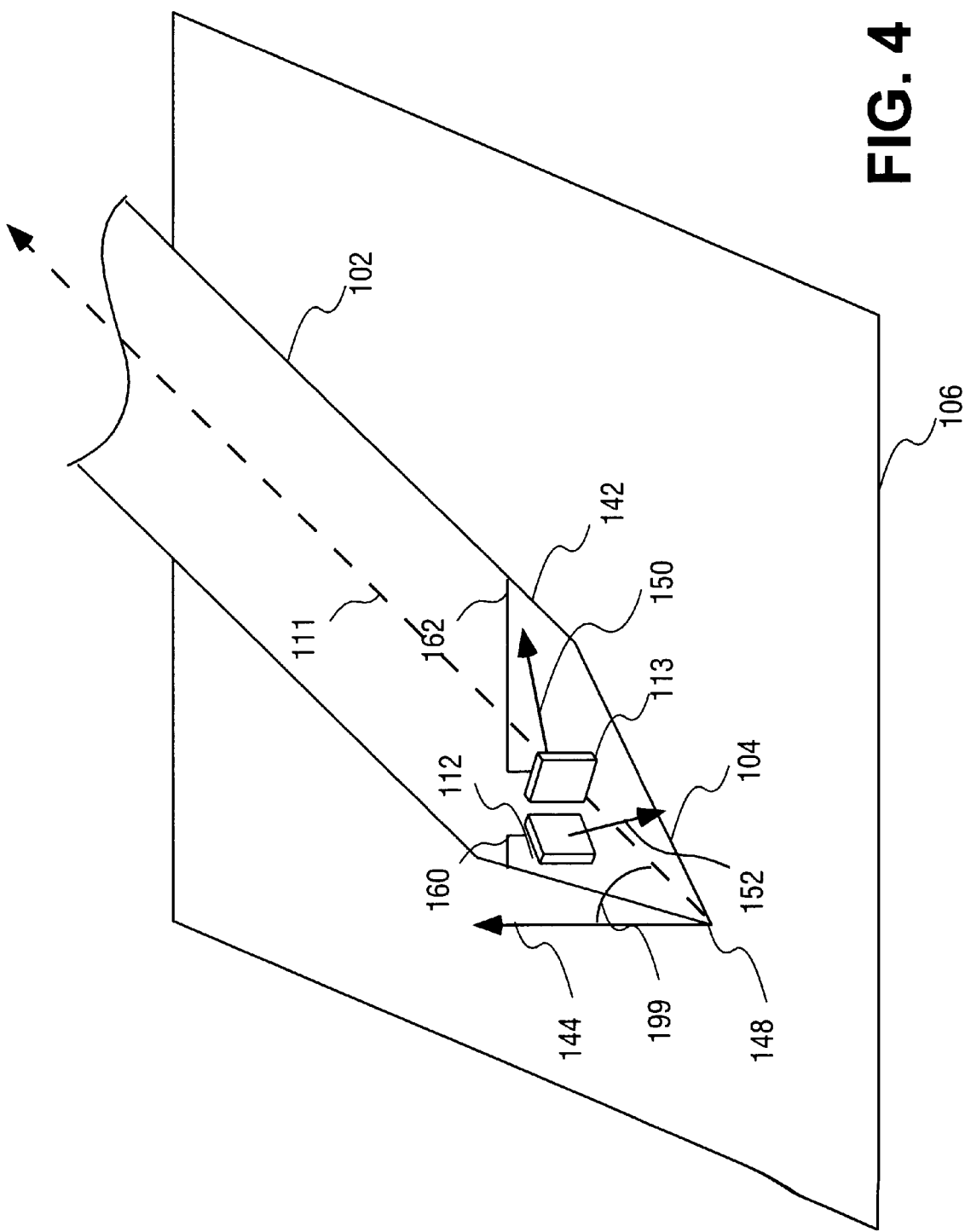
FIG. 4 illustrates a portion of an embodiment of the MD according to the present invention close to a tip of the MD.

FIG. 4 illustrates a portion of MD 100 positioned close to tip 104 thereof. MD 100 is shown in a position contacting surface 106 and making an angle alpha 199 with an axis 111. Axis 111 extends along the MD 100 from end 148 of tip 104 to another end (not shown) of MD 100 remote from tip 104. Acceleration sensors 112 and 113 are disposed adjacent to tip 104 as close as possible to the end 148 of tip 104. In one embodiment according to the present invention acceleration sensors 112 and 113 are fixedly mounted to housing 102 or to the supporting structure (not shown) in housing 102 by way of rigid supporting members 160 and 162. Acceleration sensors 112 and 113 are fixedly mounted such that normals 152 and 150 to the surfaces of the acceleration sensors are substantially perpendicular to each other and substantially perpendicular to parallel to the plane of surface normal 144 when the pen is manipulated during writing and held at a common inclination angle between normal 144 and axis 111. The common inclination angle is an average of the limits of a common angle range (such as 35°–50°) within which most users hold a pen. Acceleration sensors 112 and 113 are thus substantially vertically disposed in the housing 102 when the angle 199 is substantially equal to the above-mentioned average.

In another embodiment according to the present invention acceleration sensors 112 and 113 may be connected by a connecting device to the inner walls of housing 102, or to the support structure of housing 102. According to this configuration acceleration sensors 112 and 113 are free to align themselves vertically, parallel to normal 144, when the angle 199 is changed by the user of the pen. Note that acceleration sensors 112 and 113 may project outside housing 102 especially when one places them very close to the end 148 of tip 104. However, it is desired that the placement of acceleration sensors 112 and 113 closer to tip 104 and partially outside the housing does not obstruct view of the end 148 of tip 104. Tip 104 may have a rolling ball communicating with an ink cartridge. Alternatively, tip 104 may be made of plastic for use in connection with a screen.

Figure 5:
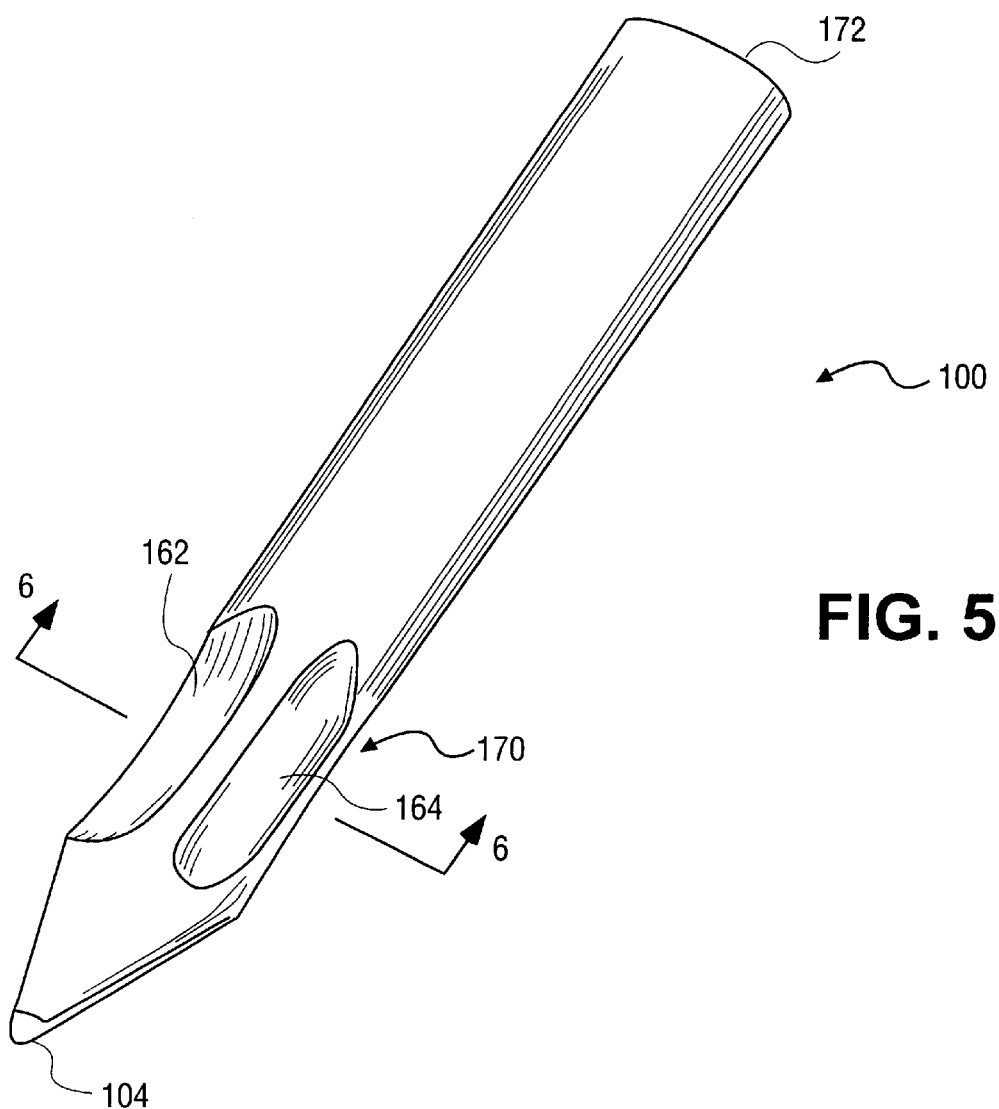
FIG. 5 illustrates a perspective view of a MD according to the present.

FIG. 5 illustrates a perspective view of one embodiment of a marking device 100 of the present invention. Marking device 100 includes a grasping portion 170 most likely to be held by the hand of a right hand user. Portion A is positioned between tip 104 and free end 172 of marking device 100. It should be understood that the embodiment of the MD 100 described in connection with FIGS. 5 and 6 may be easily adapted for left hand users by persons with ordinary skills in the art.

Figure 6:
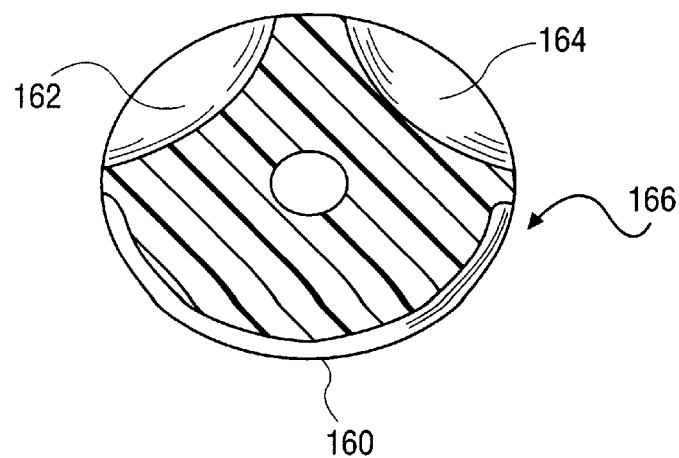
FIG. 6 illustrates a cross sectional view through lines 6—6 shown in FIG. 5.

FIG. 6 illustrates a cross sectional view through portion 170 of the MD 100 looking from line 6—6 to the back of MD 100. Cross section 166 includes several surfaces arranged, in relation to each other, such that the user may only hold MD 100 in one position preventing substantial rotation of the MD 100 around its axis 111 that passes through the tip and end 170 of the MD 100. Cross section 166 shows a first concave surface 164 configured to contact the thumb of the right hand of the user. Cross section 166 further shows a rounded convex surface 160 for contact with the middle finger of a right handed person. Cross section 166 also shows a second convex surface 162 for contact with the index finger of a right handed user. This form of the cross section 166 thus, by virtue of its shape, prevents a user from holding the pen in any other substantially different position thereby preventing changing the orientation of acceleration sensors 112 and 113. The roles of surfaces 164 and 112 would be reversed for a person holding the MD 100 in their left hand, however, the MD 100 would function in the same manner as when used in the right hand. One example of an electronic pen device that has a cross section similar to cross section 166 is the Pilot Explorer made by Pilot Pens of Japan.

Figure 7:
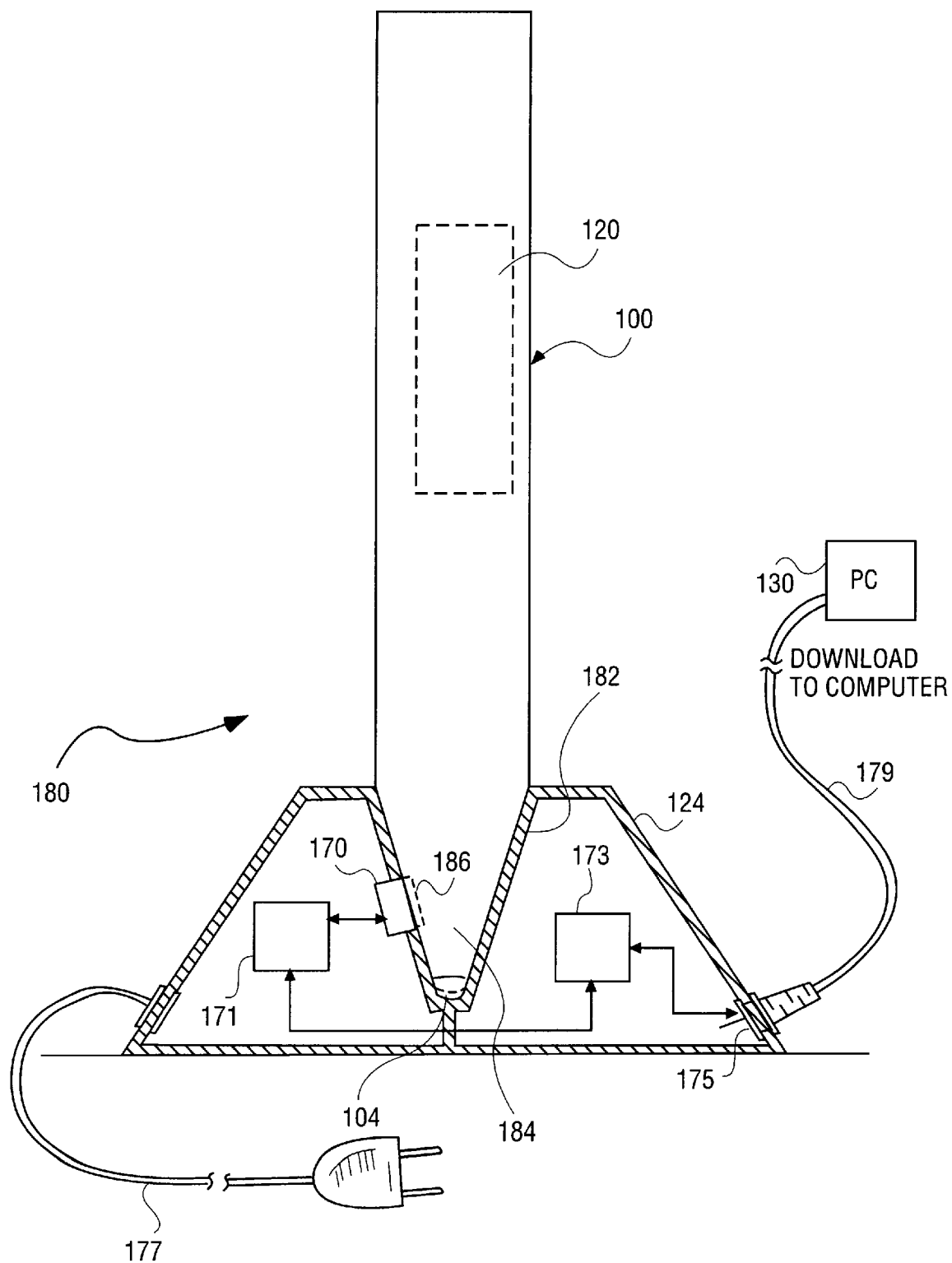
FIG. 7 illustrates an assembly that includes an embodiment of the MD according to the present invention and an embodiment of a docking station according to the present invention.

FIG. 7 illustrates an assembly 180 including an embodiment of a marking device 100 according to the present invention and docking station 124 into which MD 100 is plugged in. Docking station 124 includes a recess 182 that has a shape substantially similar to the shape of the outer surface of convex region 184 to which tip 104 abuts. Docking station 124 further includes a connector 170 that is coupled to a connector 186 of marking device 100. Connectors 170 and 186 are coupled to permit information in the form of electrical signals to be exchanged between MD 100 and docking station 124. Docking station 124 further includes a first interface 171 coupled to connector 170 of docking station 124. The first interface 171 includes circuitry designed to permit reading of the information stored in the memory 120 or for writing information to the memory 120 when the marking device is docked into docking station 124. Docking station 124 may also include a second interface circuit 173 coupled to the first interface circuit. The second interface circuit includes circuitry configured to exchange data between a data processing device 130 and the first interface circuit 171. Optionally, the docking station 124 may only have one interface connected between connectors 170 and connector 175.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A computer system comprising:
   a processor;
   an Input/Output (I/O) interface coupled to the processor;
   a docking device coupled to the I/O interface; and
   a marking device disposed adjacent to the docking device, the marking device including,
      a housing having a tip and a longitudinal axis;
      a controller coupled to the housing;
      a pressure sensor having an enable signal, wherein the enable signal is a result of a process that includes determining whether the tip is in contact with a surface, the surface having a normal axis, wherein an inclination between the normal axis and the longitudinal axis is defined by an angle alpha, the pressure sensor coupled to the controller;
      a first acceleration sensor coupled to the controller and disposed adjacent to the tip at a position that is perpendicular to the surface when angle alpha is defined by a predetermined angle value within the range of thirty five degrees to fifty degrees;
      a second acceleration sensor coupled to the controller and disposed adjacent to the tip at a position that is orthogonal to the first acceleration sensor and perpendicular to the surface when the angle alpha is the predetermined angle value;

a first support member coupled between the first acceleration sensor and the housing; and a second support member coupled between the second acceleration sensor and the housing, wherein each acceleration sensor is free to move with respect to its respective support member so as maintain the position that is perpendicular to the surface as angle alpha is changed by a user of the pen device.

2. The computer system of claim 1, the first acceleration sensor coupled to the controller through the analog-to-digital converter and the second acceleration sensor coupled to the controller through the analog-to-digital converter.

3. The computer system of claim 2, the controller having an output that includes a computer readable signal.

4. The computer system of claim 1, wherein the pressure sensor is at least one of a microswitch and an electric pressure transducer.

5. An electronic pen device, comprising:

a housing having a tip and a longitudinal axis;

a controller coupled to the housing;

means for sensing whether the tip is in contact with a surface, the surface having a normal axis, wherein an inclination between the normal axis and the longitudinal axis is defined by an angle alpha, the means for sensing coupled to the controller;

a first acceleration sensor coupled to the controller and disposed adjacent to the tip at a position that is perpendicular to the surface when angle alpha is defined by a predetermined angle value within the range of thirty five degrees to fifty degrees;

a second acceleration sensor coupled to the controller and disposed adjacent to the tip at a position that is orthogonal to the first acceleration sensor and perpendicular to the surface when the angle alpha is the predetermined angle value;

a first support member coupled between the first acceleration sensor and the housing; and a second support member coupled between the second acceleration sensor and the housing, wherein each acceleration sensor is free to move with respect to its respective support member so as maintain the position that is perpendicular to the surface as angle alpha is changed by a user of the pen device.

6. The electronic pen device of claim 5, wherein the means for sensing is a pressure sensor.

7. The electronic pen device of claim 6, wherein the pressure sensor is at least one of a microswitch and an electric pressure transducer.

8. The electronic pen device of claim 6, the pressure sensor coupled directly to the controller, the device further comprising:

a signal conditioner coupled to the first acceleration sensor and the second acceleration sensor;

an analog-to-digital converter coupled to the pressure sensor and coupled between the controller and the signal conditioner, a memory coupled to the controller;

an input/output interface coupled to the controller; and a battery coupled to the pressure sensor, the first acceleration sensor, and the second acceleration sensor.

9. The electronic pen device of claim 8, the signal conditioner including a high pass filter and a low pass filter, wherein the controller is one of a microcontroller and a microprocessor, and wherein the input/output interface is a wireless communication interface.

10. The electronic pen device of claim 5, the device further comprising:

a first support member coupled between the first acceleration sensor and the housing; and a second support member coupled between the second acceleration sensor and the housing, wherein the first support member is a rigid support member and the second support member is a rigid support member.

11. The electronic pen device of claim 5, the controller having an output that includes a computer readable signal, the housing having an external surface, wherein at least one of the first acceleration sensor and the second acceleration sensor physically extends beyond the external surface of the housing.

12. An electronic pen device, comprising:

a housing having a tip;

a conversion device coupled to the housing;

a controller coupled to the conversion device;

a pressure sensor coupled directly between the tip and the controller to enable the controller when at least one of contact and pressure is detected and coupled between the tip and the conversion device;

a means for sensing the direction and distance of movement of the tip over a surface, the means for sensing the direction and distance of movement coupled to the conversion device;

a first support member coupled between the means for sensing and the housing; and a second support member coupled between the means for sensing and the housing, wherein each acceleration sensor is free to move with respect to its respective support member so as maintain the position that is perpendicular to the surface as angle alpha is changed by a user of the pen device.

13. The electronic pen device of claim 10, wherein the conversion device is an analog-to-digital converter.

14. The electronic pen device of claim 13, wherein the means for sensing the direction and distance of movement is a first acceleration sensor disposed on a structure that is separate from a second acceleration sensor.

15. The electronic pen device of claim 14, the housing further having a longitudinal axis, the surface having a normal axis, wherein an inclination between the normal axis and the longitudinal axis is defined by an angle alpha, wherein the first acceleration sensor is disposed adjacent to the tip at a position that is perpendicular to the surface when angle alpha is defined by a predetermined angle value within the range of thirty five degrees to fifty degrees, and wherein the second acceleration sensor is disposed adjacent to the tip at a position that is orthogonal to the first acceleration sensor and perpendicular to the surface when the angle alpha is the predetermined angle value.

16. The electronic pen device of claim 13, the pressure sensor having an enable signal, wherein the enable signal is an analog signal that is a result of a process that includes contacting the tip with the surface.

* * * * *

UNITED STATES PATENT AND TRADEMARK OFFICE
CERTIFICATE OF CORRECTION

PATENT NO.     : 6,188,392 B1
DATED          : February 13, 2001
INVENTOR(S)    : Michael O'Connor et al.

It is certified that error appears in the above-identified patent and that said Letters Patent is hereby corrected as shown below:

Drawings,
Figure 3, at the location "PEN TIP" insert -- 108 --.

Signed and Sealed this

Sixth Day of August, 2002

Attest:

Attesting Officer

JAMES E. ROGAN
Director of the United States Patent and Trademark Office